United States Patent Office

3,302,716
Patented Feb. 7, 1967

3,302,716
METHOD AND COMPOSITION TO REDUCE FILTER LOSS OF FLUIDS EMPLOYED IN WELLS
Sherrod A. Williams, Dallas, Tex., assignor to Mobil Oil Corporation, a corporation of New York
No Drawing. Filed Mar. 25, 1966, Ser. No. 537,328
24 Claims. (Cl. 166—31)

This application is a continuation-in-part of application Serial No. 304,201, filed August 23, 1963, and now abandoned.

This invention relates to fluids employed in wells and relates more particularly to the treatment of such fluids to reduce their filter loss.

Fluids are employed in wells for various purposes. In the rotary drilling of oil and gas wells, for example, a drilling fluid is employed. The drilling fluid is ordinarily a suspension of solid constituents such as clays or weighting agents in a liquid such as water or an emulsion of water and oil and functions to lubricate the drill bit, carry cuttings to the surface of the ground, and impose a hydrostatic pressure to prevent flow of fluids from the drilling formations into the well borehole. As the wellbore is drilled through porous formations, difficulty is encountered as a result of loss of liquid from the drilling fluid into the formations by filtration through the sheath formed from the solid constituents of the drilling fluid on the wall of the well borehole. It is highly desirable to maintain this loss of liquid by filtration, or filter loss as it is commonly termed, as low as possible in order not only to prevent changes in the viscosity and other properties of the drilling fluid but also to prevent clogging of the formation where the formation is productive of oil or gas. Various agents have been added to drilling fluids to impart a low filter loss to the drilling fluid. However, the addition of a filter loss reducing agent to a drilling fluid in many cases results in an undesirable increase in the viscosity and gel strength of the drilling fluid.

Another fluid employed in a well is a cement composition. Thus, in the drilling of a well, the casing is secured in place in the well by cementing. In this operation, the cement composition, which is ordinarily an aqueous slurry of a solid constituent, namely, a hydraulic cement such as Portland cement, is pumped downwardly from the surface of the earth through tubing to the bottom of the well and thence upwardly between the casing and the walls of the well. Further, in the drilling of wells, porous formations are often encountered from which an undesired fluid flows into the well or into which the drilling fluid used in the drilling of the well is lost. The method of treating such formations encountered during the drilling operations is to seal the formation with cement. In these procedures, the tendency of the cement slurry to lose fluid creates difficulties. Thus, for example, with loss of fluid from a cement slurry to a porous subterranean formation, stiffening or premature setting of the cement often occurs with attendant difficulty or impossibility of completing the cementing operation, reduction in the permeability of the formation, swelling or erosion where the formation is a shale formation, reduced strength of the cement, or other undesired results. Reduction in the filter loss of the cement slurry may be effected by the addition of a filter loss reducing agent, but many of the filter loss reducing agents leave much to be desired in the way of their effect on other properties of the cement.

It is an object of this invention to reduce the filter loss of a fluid employed in a well.

It is another object of this invention to reduce the filter loss of a drilling fluid.

It is another object of this invention to effect decrease in filter loss of a drilling fluid without undue increase in viscosity and gel strength of the drilling fluid.

It is still another object of this invention to reduce the filter loss of a cement slurry employed in a well.

These and further objects of the invention will become apparent from the following detailed description.

In accordance with the invention, sulfonated poly (2,6-dimethylphenol) or salts thereof is added to a fluid to be employed in a well. I have found that the addition of the sulfonated poly (2,6-dimethylphenol) or salts thereof to a fluid to be employed in a well effectively reduces the filter loss of the fluid. Further, I have found that, with respect to a drilling fluid, the addition thereto of sulfonated poly (2,6-dimethylphenol) or salts thereof effects a minimum increase in the viscosity and gel strength of the drilling fluid.

Sulfonated poly (2,6-dimethylphenol) has the following structural formula.

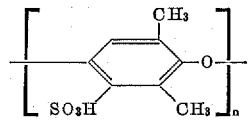

This compound is also known as sulfonated poly (2,6-dimethyl-1,4-phenylene oxide). It is obtained by sulfonating polymerized 2,6-dimethylphenol with any suitable type of sulfonating agent such as chlorosulfonic acid. It is not essential that each monomer molecule of the polymer compound be sulfonated. For example, I have found that effective reduction in filter loss can be obtained where the sulfonation of the polymer compound is carried out to the extent that 0.61, on the average, of the 2,6-dimethylphenol monomers are sulfonated. Stated otherwise, the degree of sulfonation of this compound is 0.61. Procedures for preparing the polymerized 2,6-dimethylphenol are described in an article by A. S. Hay, H. S. Blanchard, G. F. Endres, and J. W. Eustance, in the Journal of the American Chemical Society, vol 81, page 6335 (1959), and in an article by H. S. Blanchard, H. L. Finkbeiner, and G. A. Russell, in the Journal of Polymer Science, vol. 58, pages 469–490 (1962).

The salts which are effective for use in reducing filter loss include the alkali metal salts, the alkaline earth metal salts, and the ammonium salt. Thus, the sodium, potassium, lithium, rubidium, and cesium salts may be employed. From the standpoint of economy, the sodium salt is to be preferred to the other alkali metal salts. Further, the calcium, barium, magnesium, and strontium salts may be employed. Of these, the calcium salt is to be preferred. Hereinafter, for purposes of simplification of description, whenever the term "sulfonated poly (2,6-dimethylphenol)" is employed, it will be intended to mean, unless otherwise qualified, the salts as well as the acid form.

In the practice of the invention, the sulfonated poly (2,6-dimethylphenol) which may be employed has a molecular weight of at least 5,000. Preferably, however, the molecular weight of the polymer compound employed should be higher. Thus, for example, it is preferred that the molecular weight be at least 6,000. Satisfactory results are obtained where the molecular weight of the polymer compound employed is 10,000. Satisfactory results are also obtained where the molecular weight of the polymer compound is 40,000. Polymer compounds of higher molecular weights may also be employed.

The effect of the sulfonated poly (2,6-dimethylphenol) on the filter loss of a fluid for use in a well is dependent upon the molecular size of the compound. With greater molecular size, for any given molecular weight of the compound, the greater will be the effect of the compound, at low concentrations, to reduce filter loss. Thus, it is referred to use a compound that has as large a molecular size as feasible for the molecular weight of the compound. A measure of the molecular weight of the compound is its intrinsic viscosity. It is preferred to employ a compound that has an intrinsic viscosity at least as high as 0.06 deciliter per gram in aqueous solution 0.6 normal as to sodium ions at 30° C. Preferably, however, the compound should have a higher intrinsic viscosity. For example, the compound should have an intrinsic viscosity at least as high as 0.2. For measurement of intrinsic viscosity, the compound may be dissolved in aqueous solution which is 0.5 normal as to sodium chloride and 0.1 normal as to sodium sulfate.

The sulfonated poly (2,6-dimethylphenol) is employed in the fluid to be employed in a well in an amount sufficient to effect a measurable decrease in the filter loss of the fluid. Preferably, the sulfonated poly (2,6-dimethylphenol) should be employed in an amount sufficient to effect a 10 percent reduction in the filter loss. More preferably, the compound should be employed in an amount sufficient to effect a 40 percent reduction in the filter loss. Greater reductions in filter loss can also be effected. However, ordinarily, reduction of the filter loss by more than 90 percent is not economically justified. Additionally, the amounts of the polymer compound required to effect extremely high reduction in filter loss may affect other properties of the fluid to an extent that they are no longer as desirable for their intended purpose as they may be. Thus, for example, while the sulfonated poly (2,6-dimethylphenol) effects a minimum increase in viscosity and gel strength of the drilling fluid, amounts employed to effect an extremely high reduction in filter loss may affect the viscosity and gel strength of the drilling fluid to such an extent that it cannot be circulated in the well during the drilling operation.

The procedure of the invention may be employed in connection with any fluid to be employed in a well which has a continuous phase consisting of water. Thus, the process of the invention may be employed in connection with a drilling fluid or a cement slurry where the fluid phase consists entirely or substantially entirely of water. Further, the process of the invention may be employed in connection with a drilling fluid or a cement slurry containing a dispersed oil phase in the continuous aqueous phase. These latter types of fluids are ordinarily termed oil-in-water emulsion drilling fluids or cements, respectively. The fluids may be salt-contaminated fluids, i.e., containing sodium chloride. The sodium chloride in a drilling fluid may be derived from a salt formation encountered during drilling of the well. Sodium chloride in both drilling fluids and cement slurries may be derived from salt added to the fluid. Sea water may be the source of the salt. In the case of drilling fluids, the drilling fluid may also be a calcium treated or gyp drilling fluid, i.e., containing calcium sulfate. The drilling fluid may also contain other compounds such as chrome lignosulfonate.

The particular amount of polymer compound to be employed will depend to an extent upon the type of fluid. Generally, the sulfonated poly (2,6-dimethylphenol) is added to the fluid in an amount at least about 0.2 pound per barrel based upon the aqueous phase of the fluid. Larger amounts can, of course, be employed. Thus, the amount of the polymer compound added to the fluid can be as high as 3 pounds per barrel based upon the aqueous phase of the fluid. The use of still larger amounts is not precluded and the polymer compound can be employed in an amount up to 10 pounds per barrel based upon the aqueous phase of the fluid.

Where the sulfonated poly (2,6-dimethylphenol) is employed in the drilling fluid, the amount employed preferably is at least about 0.2 pound per barrel of the fluid. Larger amounts can be employed and the amount of the polymer compound added to the drilling fluid can be at least as high as 3 pounds per barrel. Further, the compound can be employed in an amount up to at least 10 pounds per barrel of the drilling fluid.

Where the sulfonated poly (2,6-dimethylphenol) is added to the cement composition, the amount employed can be at least about 0.5 percent based upon the weight of the hydraulic cement in the cement slurry. However, larger amounts may also be employed. Thus, the amount of the polymer compound can be about 1 percent by weight based upon the hydraulic cement. Even greater amounts, for example, about 2 percent by weight based upon the hydraulic cement may be employed. However, ordinarily, amounts greater than about 2 percent by weight based on the hydraulic cement are undesirable from the standpoint of economical considerations.

The following examples will be further illustrative of the invention.

*Example 1*

In this example, a salt-contaminated drilling fluid was prepared by mixing bentonite clay, barites, and water containing 7,000 parts per million of sodium chloride in the proportion of 5.7 grams of clay, 10 grams of barites, and 100 milliliters of water. The drilling fluid was then divided into three aliquots. To one aliquot was added the sodium salt of sulfonated poly (2,6-dimethylphenol) in the amount of 2 pounds per barrel of the fluid. This polymer had a molecular weight of 39,200, a degree of sulfonation of 0.61, and an intrinsic viscosity of 0.82 deciliter per gram at 30° C. in water containing 0.6 equivalent sodium ion per liter. To another aliquot was added sodium carboxymethylcellulose, a commercial polymer compound for effecting reduction in filter loss, in the amount of 2 pounds per barrel. The other aliquot was employed as a control. The three aliquots were aged for 17 hours at 180° F. Thereafter, each of the three aliquots was tested as to pH, plastic viscosity, yield point, initial and 10-minute gel strength, and filter loss. The pH was measured employing a potentiometric method involving the use of a pH meter having a glass electrode. The plastic viscosity, yield point, gel strength, and filter loss were measured in accordance with the procedure set forth in the American Petroleum Institute—API Code 29, 4th edition, May 1957, "Recommended Practice for Standard Field Procedure for Testing Drilling Fluids." The filter loss measurement was the 30-minute filter loss.

The following table gives the results obtained. In the table, and in following tables, the term "sulfonated poly (2,6-dimethylphenol)" is abbreviated to "SPDMP." Also in the tables, the term "sodium carboxymethylcellulose" is abbreviated to "NaCMC."

TABLE I
[After 17 hrs. aging at 180° F.]

| Polymer Added | Conc., lb./bbl. | pH | Plastic Viscosity, cp. | Yield Point, lb./100 sq. ft. | Gel Strengths, lb./100 sq. ft. | | Filter Loss, cc./30 min. |
|---|---|---|---|---|---|---|---|
| | | | | | Initial | 10 Minute | |
| None | | 7.3 | 4.4 | 12.4 | 7 | 9 | 74.0 |
| SPDMP | 2 | 7.2 | 6.7 | 12.4 | 7 | 10 | 14.5 |
| NaCMC | 2 | 7.2 | 13.8 | 5.2 | 2 | 3 | 24.2 |

Example 2

In this example, a calcium treated drilling fluid was prepared by mixing bentonite clay, barites, water, and calcium sulfate in the proportions of 5.75 grams of bentonite clay, 10 grams of barites, 100 milliliters of water, and 7 pounds of calcium sulfate per barrel. The drilling fluid was then divided into three aliquots. To one aliquot was added in the amount of 2 pounds per barrel the same type of sodium salt of sulfonated poly (2,6-dimethylphenol) employed in Example 1. To another aliquot was added sodium carboxymethylcellulose in the amount of 2 pounds per barrel. The other aliquot was employed as a control. The aliquots were aged for 17 hours at 180° F. At the end of the aging period, each of the three aliquots was tested for pH, plastic viscosity, yield point, gel strength, and filter loss as in Example 1.

The table below gives the results obtained.

TABLE II

[After 17 hrs. aging at 180° F.]

| Polymer Added | Conc., lb./bbl. | pH | Plastic Viscosity, cp. | Yield Point, lb./100 sq. ft. | Gel Strengths, lb./100 sq. ft. | | Filter Loss, cc./30 min. |
|---|---|---|---|---|---|---|---|
| | | | | | Initial | 10 Minute | |
| None | | 7.5 | 4.3 | 6.4 | 2 | 6 | 59.4 |
| SPDMP | 2 | 7.4 | 9.0 | 7.2 | 2 | 5 | 10.8 |
| NaCMC | 2 | 7.6 | 18.0 | 6.0 | 2 | 3 | 12.4 |

Example 3

In this example, a drilling fluid containing chrome lignosulfonate and calcium sulfate was prepared. The drilling fluid was prepared by mixing sodium bentonite, barites, calcium sulfate, and chrome lignosulfonate. The bentonite, barites, and water were employed in the proportion of 5.75 grams of bentonite, 10 grams of barites, and 100 milliliters of water. The calcium sulfate and the chrome lignosulfonate were employed in the amount of 7 pounds and 4.9 pounds, respectively, per barrel of the drilling fluid. The drilling fluid was divided into three aliquots. One aliquot was employed as a control. To one aliquot was added in the amount of two pounds per barrel the same type of sodium salt of sulfonated poly (2,6-dimethylphenol) employed in Examples 1 and 2 above. To one aliquot was added sodium carboxymethylcellulose in the amount of 2 pounds per barrel. The three aliquots were then aged and tested similarly to the aliquots in each of Examples 1 and 2.

The results obtained are given in the following table.

results with those attained by the use of the sodium carboxymethylcellulose, the plastic viscosity was increased to 13.8 centipoises. Whereas the yield point and gel strengths were reduced, the filter loss of the drilling fluid was reduced to only 24.2 milliliters as compared to 14.5 milliliters using the sodium salt of sulfonated poly (2,6-dimethylphenol).

Referring to Table II, somewhat the same results are achieved. The sodium salt of sulfonated poly (2,6-dimethylphenol) reduced the filter loss of the drilling fluid from 59.4 to 10.8 milliliters. The plastic viscosity was increased from 4.3 centipoises to 9.0 centipoises and the yield point was increased from 6.4 pounds per 100 square feet to 7.2 pounds per 100 square feet. The initial gel strength was not affected and the 10-minute gel strength was reduced from 6 to 5 pounds per 100 square feet. On the other hand, the sodium carboxymethylcellulose effected a lesser decrease in the filter loss of the drilling fluid while increasing the plastic viscosity to 18 centipoises.

Referring to Table III, the sodium salt of sulfonated poly (2,6-dimethylphenol) reduced the filter loss of the drilling fluid from 50 milliliters to 7.4 milliliters. The plastic viscosity was increased from 5.3 to 9.6 centipoises. The yield point was reduced from 1.6 to 0.6 pound per 100 square feet. The initial gel strength was not affected while the 10-minute gel strength was increased to 1 pound per 100 square feet. The sodium carboxymethylcellulose, on the other hand, effected a lesser decrease in the filter loss and increased the plastic viscosity to 22 centipoises. It also increased the gel strengths.

Example 4

In this example, a cement slurry was prepared by mixing Portland cement and water in the proportion of 800 parts by weight of Portland cement to 368 parts by weight of water. This cement slurry was then divided

TABLE III

[After 17 hrs. aging at 180° F.]

| Polymer Added | Conc., lb./bbl. | pH | Plastic Viscosity, cp. | Yield Point, lb./100 sq. ft. | Gel Strengths, lb./100 sq. ft. | | Filter Loss, cc./30 min. |
|---|---|---|---|---|---|---|---|
| | | | | | Initial | 10 Minute | |
| None | | 6.9 | 5.3 | 1.6 | 0 | 0 | 50.0 |
| SPDMP | 2 | 6.8 | 9.6 | 0.6 | 0 | 1 | 7.4 |
| NaCMC | 2 | 6.8 | 22.0 | 1.0 | 1 | 2 | 12.5 |

It will be observed from the three tables above that the sodium salt of sulfonated poly (2,6-dimethylphenol) effected satisfactory reduction in the filter loss of the drilling fluid while effecting only a minimum increase in viscosity, yield point, and gel strengths of the drilling fluid. More specifically, referring to Table I, it will be noted that, following the aging, the filter loss of the drilling fluid was reduced from 74 milliliters to 14.5 milliliters by the sodium salt of sulfonated poly (2,6-dimethylphenol). On the other hand, the plastic viscosity was increased to only 6.7 centipoises from 4.4 centipoises; the yield point was not affected; the initial gel strength was not affected; and the 10-minute gel strength was increased to only 10. On the other hand, comparing these into eight aliquots. The first aliquot was employed as a control. To the next three aliquots was added sulfonated poly (2,6-dimethylphenol) in the amounts of 4, 8, and 16, respectively, parts by weight based upon 800 parts by weight of the Portland cement. The plastic viscosity, yield point, gel strengths, and filter loss of these first four aliquots were then determined at a temperature of 75° F. To the next three aliquots were added 16 parts by weight of sulfonated poly (2,6-dimethylphenol) per 800 parts by weight of the Portland cement. There were also added to these latter three aliquots 12 parts by weight per 800 parts by weight of the Portland cement of a commercial additive for retarding the setting time of the cement. The filter loss of each of these three aliquots was determined at 75°, 200°, and 300° F., respectively. To the eighth aliquot were added per 800 parts by weight of the Portland cement 32 parts by weight of sulfonated poly (2,6-dimethylphenol) and 12 parts by weight of the commercial additive mentioned above for retarding the setting time of the cement. The filter loss of this aliquot was measured at 300° F. The determinations of plastic viscosity, yield point, gel strengths, and filter loss were made in accordance with the procedure set forth in the publication of the American Petroleum Institute, 14th edition, March 1965, "Recommended Practice for Testing Oil Well Cements and Cement Additives," API–RP–10B. The filter loss measurement was the 30-minute filter loss and in the case of the first, second, and seventh aliquots, the filter loss was that obtained by extrapolating the loss to 30 minutes.

The following table gives the results obtained.

TABLE IV

| Materials Used | | | | Temp., °F. | Properties | | | | |
|---|---|---|---|---|---|---|---|---|---|
| Portland Cement | Water | SPDMP | Set Retarder | | Plastic Viscosity, cp. | Yield Point, lb./100 sq. ft. | Gel Strengths, lb./100 sq. ft. | | Filter Loss, cc./30 min. |
| | | | | | | | Initial | 10 Min. | |
| 800 | 368 | | | 75 | 28 | 72 | 6 | 17 | 900 |
| 800 | 368 | 4 | | 75 | 35 | 0 | 0 | 0 | 200 |
| 800 | 368 | 8 | | 75 | 48 | 0 | 0 | 0 | 18 |
| 800 | 368 | 16 | | 75 | 103 | 26 | 1 | 4 | 12 |
| 800 | 368 | 16 | 12 | 75 | | | | | 21 |
| 800 | 368 | 16 | 12 | 200 | | | | | 102 |
| 800 | 368 | 16 | 12 | 300 | | | | | 325 |
| 800 | 368 | 32 | 12 | 300 | | | | | 132 |

It will be observed from the table that the filter loss of the control aliquot was 900 cc. per 30 minutes. In each of the remaining aliquots where the sulfonated poly (2,6-dimethylphenol) was employed, the filter loss was considerably lower. It will also be observed that, with respect to the first four aliquots, whereas the polymer compound increased the plastic viscosity of the cement slurry, the increase was moderate. Further, the smaller amounts of the sulfonated poly (2,6-dimethylphenol) decreased the yield point and gel strengths of the cement slurry to zero but with the amounts beginning with about 16 parts by weight per 800 parts by weight of the Portland cement, yield point and gel strengths were restored.

Having thus described my invention, it will be understood that such description has been given by way of illustration and example and not by way of limitation, reference for the latter purpose being had to the appended claims.

I claim:

1. A fluid to be employed in a well, said fluid containing said constituents and having a continuous aqueous phase, said continuous aqueous phase containing in an amount sufficient to reduce the filter loss thereof a compound selected from the group consisting of sulfonated poly (2,6-dimethylphenol) and the alkali metal, alkaline earth metal, and ammonium salts thereof and having a molecular weight of at least 5,000.

2. The fluid of claim 1 wherein said compound selected from the group consisting of sulfonated poly (2,6-dimethylphenol) and the alkali metal, alkaline earth metal, and ammonium salts thereof is in an amount of at least 0.2 pound per barrel of said aqueous phase in said fluid.

3. The fluid of claim 1 wherein said compound selected from the group consisting of sulfonated poly (2,6-dimethylphenol) and the alkali metal, alkaline earth metal, and ammonium salts thereof has an intrinsic viscosity of at least 0.06 deciliter per gram in aqueous solution containing sodium ions in an amount of 0.6 normal at 30° C.

4. The fluid of claim 3 wherein said compound selected from the group consisting of sulfonated poly (2,6-dimethylphenol) and the alkali metal, alkaline earth metal, and ammonium salts thereof is in an amount of at least 0.2 pound per barrel of said aqueous phase in said fluid.

5. A drilling fluid containing solid constituents and having a continuous aqueous phase, said continuous aqueous phase containing as an agent to reduce filter loss thereof and in an amount sufficient to reduce the filter loss thereof a compound selected from the group consisting of sulfonated poly (2,6-dimethylphenol) and the alkali metal, alkaline earth metal, and ammonium salts thereof and having a molecular weight of at least 5,000.

6. The drilling fluid of claim 5 wherein the compound selected from the group consisting of sulfonated poly (2,6-dimethylphenol) and the alkali metal, alkaline earth metal, and ammonium salts thereof having a molecular weight of at least 5,000 is in an amount of at least 0.2 pound per barrel.

7. The drilling fluid of claim 5 wherein the compound selected from the group consisting of sulfonated poly (2,6-dimethylphenol) and the alkali metal, alkaline earth metal, and ammonium salts thereof has an intrinsic viscosity of at least 0.06 deciliter per gram in aqueous solution containing sodium ions in the amount of 0.6 normal at 30° C.

8. The drilling fluid of claim 7 wherein said compound selected from the group consisting of sulfonated poly (2,6-dimethylphenol) and the alkali metal, alkaline earth metal, and ammonium salts thereof is in an amount of at least 0.2 pound per barrel of said drilling fluid.

9. In a process for drilling a well in the earth wherein a drilling fluid containing solid constituents and a continuous aqueous phase is circulated through said well during said drilling, the steps comprising adding to said drilling fluid a compound selected from the group consisting of sulfonated poly (2,6-dimethylphenol) and the alkali metal, alkaline earth metal, and ammonium salts thereof, said compound having a molecular weight of at least 5,000 in an amount sufficient to reduce the filter loss of said drilling fluid but insufficient to increase the viscosity of said drilling fluid to such an extent that it cannot be circulated, and circulating said drilling fluid in said well.

10. The process of claim 9 wherein said compound selected from the group consisting of sulfonated poly (2,6-dimethylphenol) and the alkali metal, alkaline earth metal, and ammonium salts thereof is added to said drilling fluid in an amount of at least 0.2 pound per barrel.

11. The process of claim 9 wherein said compound selected from the group consisting of sulfonated poly (2,6-dimethylphenol) and the alkali metal, alkaline earth metal, and ammonium salts thereof added to said drilling fluid has an intrinsic viscosity of at least 0.06 deciliter per gram in aqueous solution containing sodium ions in the amount of 0.6 normal at 30° C.

12. The process of claim 11 wherein said compound selected from the group consisting of sulfonated poly (2,6-dimethylphenol) and the alkali metal, alkaline earth metal, and ammonium salts thereof is added to said drilling fluid in an amount of at least 0.2 pound per barrel.

13. A cement composition for use in a well, said cement composition containing solid constituents consisting of a hydraulic cement and having a continuous aqueous phase, said continuous aqueous phase containing in an amount sufficient to reduce the filter loss thereof a compound selected from the group consisting of sulfonated poly (2,6-dimethylphenol) and the alkali metal, alkaline earth metal, and ammonium salts thereof and having a molecular weight of at least 5,000.

14. The cement composition of claim 13 wherein said compound selected from the group consisting of sulfonated poly (2,6-dimethylphenol) and the alkali metal, alkaline earth metal, and ammonium salts thereof is contained in said aqueous phase in an amount of at least 0.5 percent by weight of said hydraulic cement.

15. The cement composition of claim 13 wherein said compound selected from the group consisting of sulfonated poly (2,6-dimethylphenol) and the alkali metal, alkaline earth metal, and ammonium salts thereof is contained in said aqueous phase in an amount of at least 1 percent by weight of said hydraulic cement.

16. The cement composition of claim 13 wherein the compound selected from the group consisting of sulfonated poly (2,6-dimethylphenol) and the alkali metal, alkaline earth metal, and ammonium salts thereof is contained in said aqueous phase in an amount of at least 2 percent by weight of said hydraulic cement.

17. The cement composition of claim 13 wherein said compound selected from the group consisting of sulfonated poly (2,6-dimethylphenol) and the alkali metal, alkaline earth metal, and ammonium salts thereof has an intrinsic viscosity of at least 0.06 deciliter per gram in aqueous solution containing sodium ions in an amount of 0.6 normal at 30° C.

18. The cement composition of claim 17 wherein said compound selected from the group consisting of sulfonated poly (2,6-dimethylphenol) and the alkali metal, alkaline earth metal, and ammonium salts thereof is contained in said aqueous phase in an amount of at least 0.5 percent by weight of said hydraulic cement.

19. In a process for cementing a well in the earth wherein a cement composition containing solid constituents comprising hydraulic cement and having a continuous aqueous phase is placed in said well, the steps comprising adding to said cement composition a compound selected from the group consisting of sulfonated poly (2,6-dimethylphenol) and the alkali metal, alkaline earth metal, and ammonium salts thereof, said compound having a molecular weight of at least 5,000 and in an amount sufficient to reduce the filter loss of said cement composition, and placing said cement composition in said well.

20. The process of claim 19 wherein said compound selected from the group consisting of sulfonated poly (2,6-dimethylphenol) and the alkali metal, alkaline earth metal, and ammonium salts thereof is added to said cement composition in an amount of at least 0.5 percent by weight of said hydraulic cement.

21. The process of claim 19 wherein said compound selected from the group consisting of sulfonated poly (2,6-dimethylphenol) and the alkali metal, alkaline earth metal, and ammonium salts thereof is added to said cement composition in an amount of at least 1 percent by weight of said hydraulic cement.

22. The process of claim 19 wherein said compound selected from the group consisting of sulfonated poly (2,6-dimethylphenol) and the alkali metal, alkaline earth metal, and ammonium salts thereof is added to said cement composition in an amount of at least 2 percent by weight of said hydraulic cement.

23. The process of claim 19 wherein said compound selected from the group consisting of sulfonated poly (2,6-dimethylphenol) and the alkali metal, alkaline earth metal, and ammonium salts thereof has a molecular weight of at least 5,000 and an intrinsic viscosity of at least 0.06 deciliter per gram in aqueous solution containing sodium ions in the amount of 0.6 normal at 30° C.

24. The process of claim 23 wherein said compound selected from the group consisting of sulfonated poly (2,6-dimethylphenol) and the alkali metal, alkaline earth metal, and ammonium salts thereof is added to said cement composition in an amount of at least 0.5 percent by weight of said hydraulic cement.

References Cited by the Examiner
UNITED STATES PATENTS

| | | | |
|---|---|---|---|
| 2,650,905 | 9/1953 | Fordyce et al. | 252—8.5 |
| 2,681,312 | 6/1954 | Salathiel | 252—8.5 |
| 3,137,576 | 6/1964 | Himmelmann et al. | 260—49 |

References Cited by the Applicant
UNITED STATES PATENTS

| | | |
|---|---|---|
| 2,649,414 | 8/1953 | Salathiel. |
| 3,007,864 | 11/1961 | Adolphson et al. |
| 3,025,236 | 3/1962 | Barrett et al. |
| 3,039,958 | 6/1962 | Monroe. |

JACOB L. NACKENOFF, *Primary Examiner.*

CHARLES E. O'CONNELL, *Examiner.*

S. J. NOVOSAD, *Assistant Examiner.*

UNITED STATES PATENT OFFICE
CERTIFICATE OF CORRECTION

Patent No. 3,302,716                          February 7, 1967

Sherrod A. Williams

It is hereby certified that error appears in the above numbered patent requiring correction and that the said Letters Patent should read as corrected below.

Column 7, line 54, for "said" read -- solid --; column 10, after line 45, insert the following references:

An article by A. S. Hay, H. S. Blanchard, G. F. Endres, and J. W. Eustance in the Journal of the American Chemical Society, vol. 81, p. 6335 (1959).

An article by H. S. Blanchard, H. L. Finkbeiner, and G. A. Russell in the Journal of Polymer Science, vol. 58, pp. 469-490 (1962).

Signed and sealed this 17th day of October 1967.

(SEAL)
Attest:

EDWARD M. FLETCHER, JR.                      EDWARD J. BRENNER
Attesting Officer                              Commissioner of Patents